United States Patent
Huang et al.

(10) Patent No.: US 7,814,507 B2
(45) Date of Patent: Oct. 12, 2010

(54) METHOD FOR CONTROLLING BALL AUTO-BALANCE SYSTEM OF OPTICAL DISK DRIVE

(75) Inventors: Yi-Min Huang, Taipei (TW); Guang-Hwa Tarng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 363 days.

(21) Appl. No.: 12/062,993

(22) Filed: Apr. 4, 2008

(65) Prior Publication Data

US 2008/0253246 A1  Oct. 16, 2008

(30) Foreign Application Priority Data

Apr. 13, 2007 (TW) .............................. 96113108 A

(51) Int. Cl.
*G11B 17/028* (2006.01)
(52) U.S. Cl. ...................................... 720/702
(58) Field of Classification Search .................. 720/702
See application file for complete search history.

(56) References Cited

U.S. PATENT DOCUMENTS

| 6,249,505 B1 | 6/2001 | Miyamoto et al. |
| 6,430,144 B1 | 8/2002 | Liao et al. |
| 7,028,320 B2 * | 4/2006 | Kuo et al. ............... 720/702 |

FOREIGN PATENT DOCUMENTS

| CN | 1474394 | 2/2004 |
| CN | 1505014 | 6/2004 |
| JP | 11-098759 | 4/1999 |

* cited by examiner

*Primary Examiner*—Aristotelis Psitos
(74) *Attorney, Agent, or Firm*—Muncy, Geissler, Olds & Lowe, PLLC

(57) ABSTRACT

A method for controlling a ball auto-balancing system of an optical disk drive is provided. A rotational member is fixed on a rotating axis of an optical disk drive and rotates synchronously therewith. A spindle motor drives the rotational member to accelerate and decelerate within the rotating speed range at least twice. When the spindle motor accelerates and decelerates for many times, if the measured central error value is greater than the last measured one, the accelerating and decelerating range is adjusted.

4 Claims, 4 Drawing Sheets

METHOD FOR CONTROLLING BALL AUTO-BALANCE SYSTEM OF OPTICAL DISK DRIVE

RELATED APPLICATIONS

This application claims priority to Taiwan Application Serial Number 96113108, filed Apr. 13, 2007, which is herein incorporated by reference.

BACKGROUND OF THE INVENTION

1. Field of the Invention

The invention relates to a ball auto-balancing system (ABS) of an optical disk drive and, more particularly, to a method for controlling a ball ABS of an optical disk drive.

2. Description of the Related Art

With the rapid development of optical storage media, high-speed optical disk drives are required. The high reading and writing speed of the optical disk drive means that the optical disk drive can read and write data at a high rotating speed of a spindle motor. The stability of the optical disk drive reading optical disks is affected by large vibrations at the high rotating speed and unbalance due to the unbalance disks.

For the high-speed optical disk drives, too large vibrations often result in instability of servo signals that optical pick-up heads use to read the optical disks, and therefore the optical disk drives fail to read or write the optical disks at the high speed. Further, noise produced when the optical disk drives rotate at the high rotating speed also results in torment and discomfort of users. Therefore, it becomes important to effectively control the vibrations caused by the spindle motor at the high speed and to ensure that the optical disk drives can read or write the optical disks at the high speed.

To solve the above problems, a so-called auto-balancing system (ABS) has been widely used in the optical disk drives. The ABS includes balancing mass (usually a plurality of balls) and a rotational member (it is usually circular) carrying the balancing mass. The rotational member is fixed on a rotating axis of the spindle motor and rotates synchronously therewith. The balancing mass slides freely in a circular single-track or multi-track track in the rotational member. For the ABS, based on Rotor Dynamics, when the rotating speed of the spindle motor is greater than a critical speed, the balancing mass automatically rolls to a balancing position with unbalance due to an unbalance disc, and therefore the vibrations produced when the spindle motor rotates at the high speed can be effectively reduced.

For the high-speed optical disk drives, each manufacturer of the optical disk drives designs an optimum rotating speed controlling curve of the spindle motor for the ABS of the optical disk drives to allow the balancing mass to rapidly roll to the best balancing position. However, when the manufacturers manufacture the optical disk drives, the resonances of the ABS for each optical disk drive are different because of the manufacturing tolerance of each spindle motor. Therefore, the rotating speed controlling curve of the ABS of the spindle motor of one optical disk drive usually cannot be applied to the ABS of the other optical disk drives, so that the balls may fail to be balanced to the best vibration damping position thus to increase the vibrations of the optical disk drives.

BRIEF SUMMARY OF THE INVENTION

An objective of the invention is to provide a ball balancing method for a ball auto-balancing system (ABS) of an optical disk drive. The ball balancing method can be applied to all the ABS.

According to the above objectives, a method for controlling a ball ABS of an optical disk drive is provided. In one embodiment, the optical disk drive includes a spindle motor and a rotational member containing at least one ball. The method includes the following steps. An accelerating and decelerating range of the spindle motor is set, and it is between a first rotating speed and a second rotating speed. The first rotating speed is less than the second rotating speed. The first rotating speed is less than a resonance of the ball ABS. The second rotating speed is greater than the resonance. The difference between the resonance and the first rotating speed is less than 500 revolutions per minute (RPM). The spindle motor drives the rotational member to accelerate and decelerate within the accelerating and decelerating range at least twice. A central error value of the optical disk drive is measured after the spindle motor accelerates and decelerates within the accelerating and decelerating range every time. If the central error value is less than a predetermined value, the spindle motor is controlled to accelerate to a working rotating speed.

In one embodiment, the accelerating and decelerating range may be between 200 RPM and 2800 RPM or between 2300 RPM and 3300 RPM.

In one embodiment, when the spindle motor drives the rotational member to accelerate and decelerate for many times, if the measured central error value is greater than the last measured central error value, the accelerating and decelerating range is adjusted.

In one embodiment, if the number of times for which the spindle motor accelerates and decelerates within the accelerating and decelerating range is greater than a predetermined number of times (such as five times), the spindle motor stops accelerating and decelerating.

Therefore, in the ball balancing method of a ball ABS according to the invention, a rotational member is driven to repeat to accelerate and decelerate within a rotating speed range, and therefore the ball is balanced to a best vibration damping position of a circular track. Further, when the ABS produces a large variation because of manufacturing tolerance, the accelerating and decelerating range is adjusted to apply to the ABS of all the optical disk drives.

These and other features, aspects, and advantages of the present invention will become better understood with regard to the following description, appended claims, and accompanying drawings.

DETAILED DESCRIPTION OF THE EMBODIMENTS

The invention provides a ball balancing method for a ball auto-balancing system (ABS) of an optical disk drive. Details of the preferred embodiments of the invention are described hereinbelow.

Figure 1:
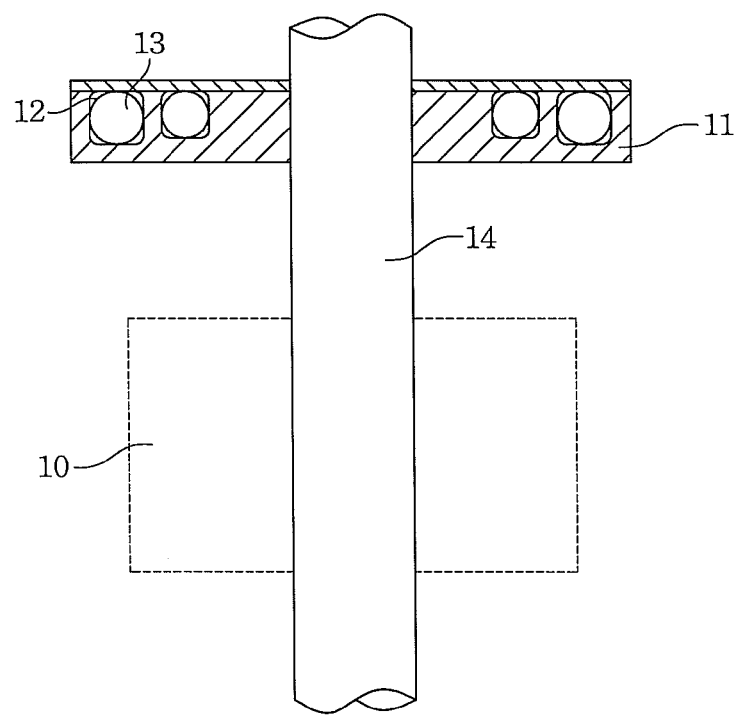
FIG. 1 is a diagram showing an auto-balancing system (ABS) of an optical disk drive according to a preferred embodiment of the invention.

FIG. 1 is a diagram showing an ABS of an optical disk drive according to a preferred embodiment of the invention. In FIG. 1, the ABS of the optical disk drive includes a spindle motor 10, a rotational member 11 and a rotating axis 14, wherein the rotational member 11 includes at least one circular track 12 for containing balls 13 (such as steel balls).

The rotational member 11 is disposed above the spindle motor 10, and the rotational member 11 can rotate synchronously with the spindle motor 10. That is, the optical disk drive can rotate the rotating axis 14 by driving the spindle motor 10 to allow the rotational member 11 to rotate synchronously with the spindle motor 10. Therefore, the rotational member 11 can rotate an optical disk (not shown) thereon to allow a pick-up head (not shown) of the optical disk drive to read or write data.

In this embodiment, the at least one circular track 12 is disposed around the rotating axis 14 in the form of concentric circles. The internal diameter of the circular track 12 fits the size of the balls 13 to allow the balls 13 to smoothly move in the circular track 12 and thus to move to a best vibration damping position.

Figure 2:
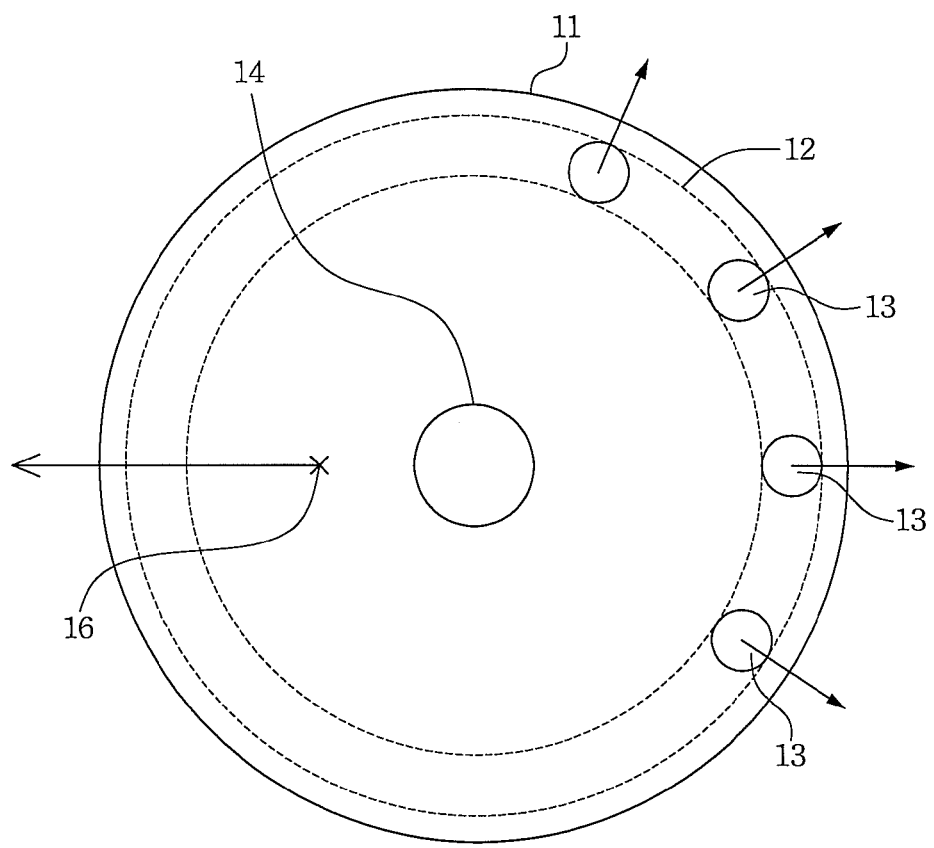
FIG. 2 is a schematic diagram showing a method for damping vibrations for an ABS of an optical disk drive according to a preferred embodiment of the invention.

FIG. 2 is a schematic diagram showing a method for damping vibrations for an ABS of an optical disk drive according to a preferred embodiment of the invention. When the rotating axis 14 carries the optical disk and the whole unbalance 16 deviates the rotating axis 14, the rotating speed of the rotating axis 14 is appropriately controlled to allow the balls 13 to move to the best vibration damping position in the area which needs to be balanced in the circular track 12. Therefore, the rotating axis 14 can steadily rotate the optical disk, and the whole vibration of the optical disk drive is also reduced. As for how to make the balls 13 balanced to the best vibration damping position in the circular track 12, the method for controlling the rotating speed of the spindle motor is described in detail hereinbelow.

In a preferred embodiment of the invention, the accelerating and decelerating range of the spindle motor 10 is set, and it may be, for example, between a first rotating speed (2200 RPM) and a second rotating speed (2800 RPM). In the other embodiments, the accelerating and decelerating range also can be between 2300 RPM and 3300 RPM. The first rotating speed is less than the second rotating speed; the first rotating speed is less than a resonance (such as 2400 RPM) of the ball ABS; the second rotating speed is greater than the resonance; the difference between the resonance and the first rotating speed is less than 500 RPM.

Next, the spindle motor 10 drives the rotational member 11 to accelerate and decelerate within the accelerating and decelerating range at least twice. Then after the spindle motor 10 accelerates and decelerates within the accelerating and decelerating range every time, a central error value of the optical disk drive is measured, wherein the central error value may be produced by the pick-up head which has a photo-sensor. If the central error value is less than a predetermined value, the spindle motor 10 is controlled to accelerate to a working rotating speed. The more detailed embodiments are described hereinbelow.

Figure 3:
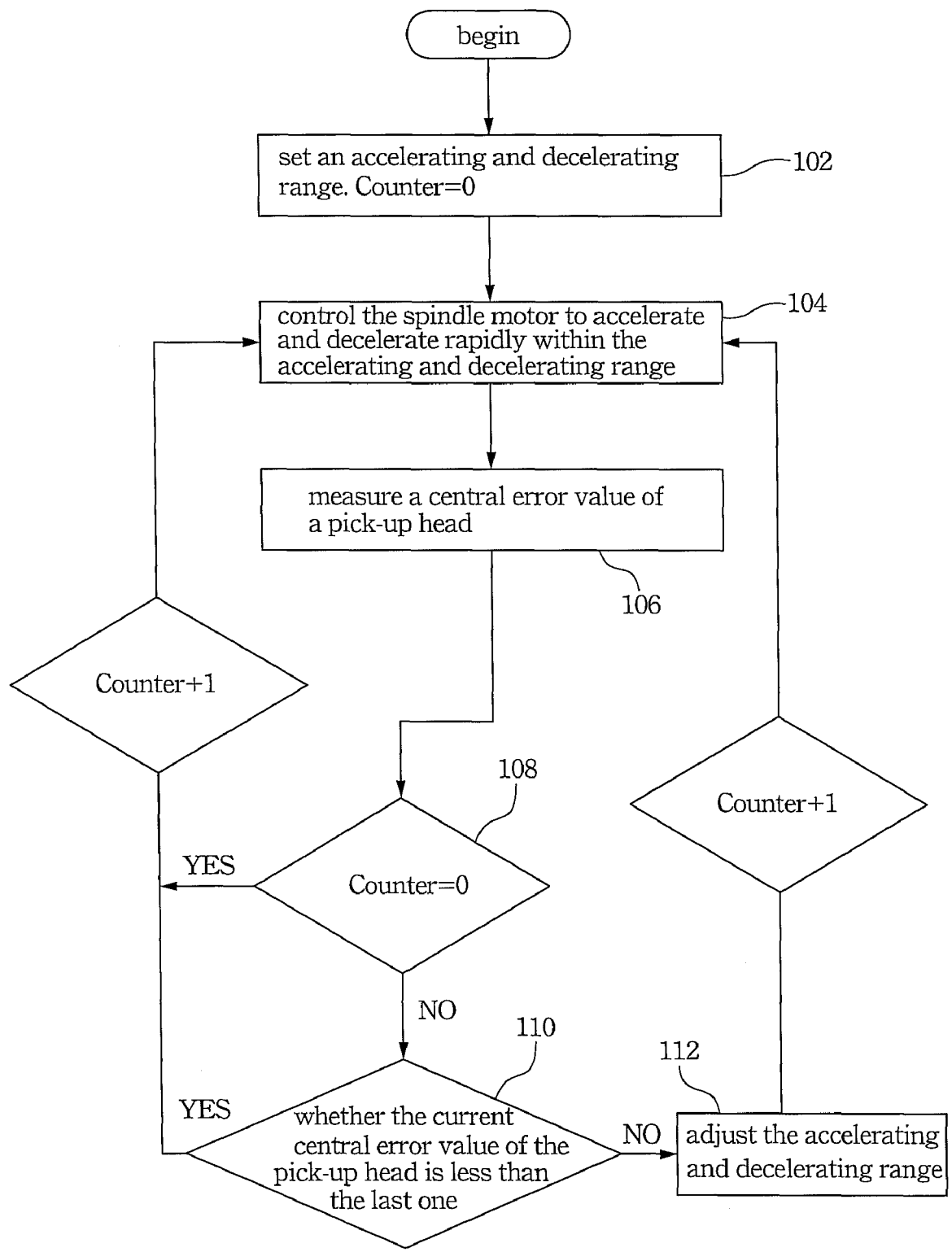
FIG. 3 is a part of flow chart showing a method for controlling a ball ABS of an optical disk drive according to a preferred embodiment of the invention.

FIG. 3 is a part of flow chart showing a method for controlling an ABS of an optical disk drive according to a preferred embodiment of the invention. Please refer to FIG. 1, FIG. 2, FIG. 3 and FIG. 5. The following method for controlling the ABS of the optical disk drive can be realized by a driving firmware of the optical disk drive. The driving firmware can be stored in a firmware module 302 (such as a read-only memory or a flash memory). A processor 304 reads and executes the driving firmware in the firmware module 302 to obtain an execution result (rotating speed). The driving module 308 drives the spindle motor 10 of the optical disk drive 310 to make the speed of the spindle motor 10 achieve the objective speed. It is described how the processor 304 executes the driving firmware to control the ABS of the optical disk drive in detail hereinbelow.

In step 102, after the processor 304 executes the driving firmware, the accelerating and decelerating range of the spindle motor 10 is set. In this embodiment, the accelerating and decelerating range may be between 2200 RPM and 2800 RPM.

In step 104, the driving module 308 drives the spindle motor 10 of the optical disk drive 310 to accelerate and decelerate rapidly within the accelerating and decelerating range. For example, the rotating speed of the spindle motor 10 increases from 2200 RPM to 2800 RPM and then decreases from 2800 RPM to 2200 RPM thus to rotate the rotational member 11 synchronously, and therefore the balls 13 can be balanced to the vibration damping position in the circular track 12.

In step 106 (after the spindle motor 10 accelerates and decelerates rapidly), the processor 304 receives the central error value measured by the pick-up head of the optical disk drive 310. The less the central error value which the pick-up head measures is, the better the effect of the vibration damping in the step 104 is (the balls 13 can be balanced to the preferred vibration damping position in the circular track 12).

In step 108, the processor 304 determines whether the spindle motor 10 executes the steps 104 and 106 for the first time according to the value of a counter 306 (Counter=0). When the spindle motor 10 executes the steps 104 and 106 for the first time, the steps 104 and 106 are directly executed for the second time. After the spindle motor 10 executes the steps 104 and 106 for the second time (Counter=1, 2, 3, 4 and so on), a step 110 is executed.

In step 110, the processor 304 compares the two measured central error values of the pick-up head in the step 106 executed for the first and second times. For example, after the step 104 is respectively executed for the first and second times, the central error values of the pick-up head are compared. When the present central error of the pick-up head is less than the last central error, the steps 104 and 106 are executed. In this embodiment, the number of executing times of the step 104 can be directly set (at least two times) according to the requirements of designer designing the firmware of the optical disk drive to allow the balls 13 to be balanced to the preferred vibration damping position in the circular track 12. When the present central error of the pick-up head is greater than the last central error, which means that the balls 13 are balanced to a worse vibration damping position in the circular track 12 after the step 104 is executed, and which also means the present accelerating and decelerating range is inappropriate, the step 112 is executed next. Therefore, the accelerating and decelerating range of the spindle motor 10 should be adjusted to a better one.

In the step 112, after the processor 304 executes the driving firmware, the accelerating and decelerating range is adjusted to a new one. In this embodiment, the accelerating and decelerating range can be adjusted from 2200 RPM~2800 RPM to 2400 RPM~2800 RPM. Generally speaking, the accelerating and decelerating range should include a resonance frequency range of the optical disk drive. The resonance frequency of the optical disk drive is not easily measured and the resonance frequency range may be very large, and therefore the controlling method is used to adjust the accelerating and decelerating range to a better one.

Further, to reduce the executing time of the controlling method, the firmware designer can choose a better accelerating and decelerating range from some experience values as the accelerating and decelerating range when the step 104 is executed for the first time. Therefore, the number of executing times of the step 112 can be reduced.

Figure 4:
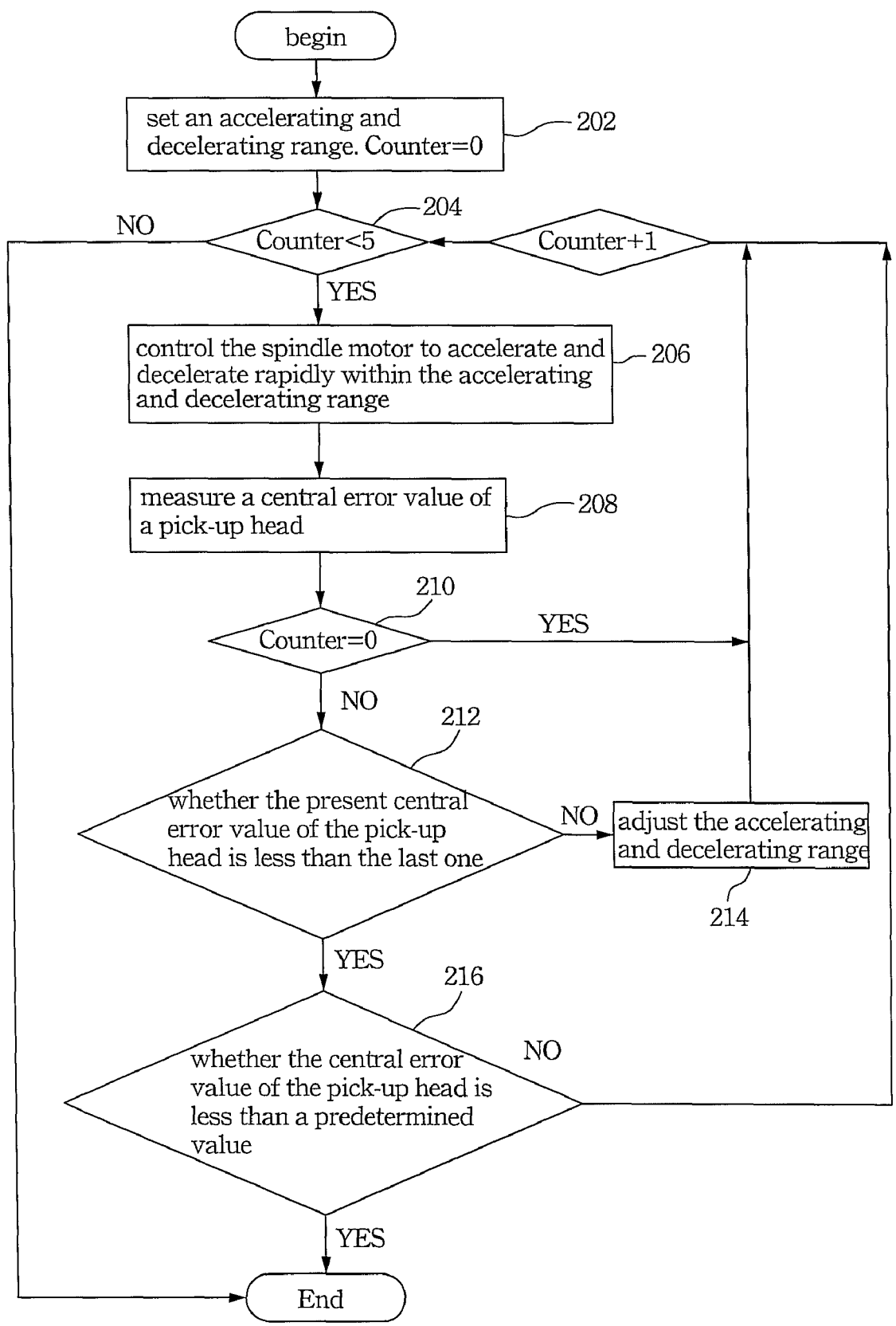
FIG. 4 is a flow chart showing a method for controlling a ball ABS of an optical disk drive according to another preferred embodiment of the invention.
Figure 5:
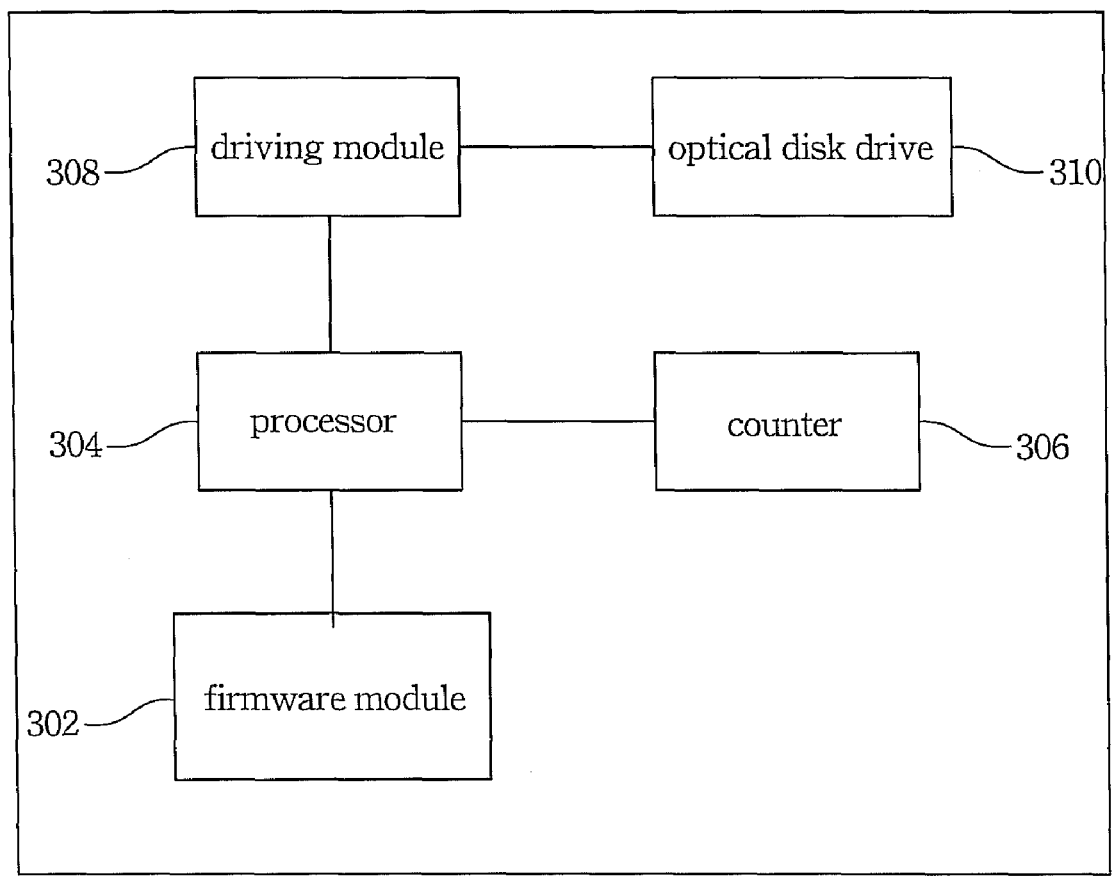
FIG. 5 is a block diagram showing a ball ABS of an optical disk drive according to a preferred embodiment of the invention.

FIG. 4 is a flow chart showing a method for controlling an ABS of an optical disk drive according to another preferred embodiment of the invention. Please refer to FIG. 1, FIG. 2, FIG. 4 and FIG. 5. The following method for controlling the ABS of the optical disk drive can be realized by the driving firmware of the optical disk drive.

In the commercialized optical disk drives, consumers may fail to stand the too long controlling time of the ABS (the time of balancing the balls to the preferred vibration damping position). Therefore, some steps can be added into the method in FIG. 4 to reduce the time of balancing the balls 13 to the preferred vibration damping position in the circular track 12. The following method for controlling the ABS of the optical disk drive can be realized by the driving firmware of the optical disk drive. The driving firmware can be stored in the firmware module 302. The processor 304 reads and executes the driving firmware in the firmware module 302 to obtain an execution result (rotating speed). The driving module 308 drives the spindle motor 10 of the optical disk drive 310 to make the speed of the spindle motor 10 achieve the objective speed. It is described how the processor 304 executes the driving firmware to control the ABS of the optical disk drive in detail hereinbelow.

In step 202, after the processor 304 executes the driving firmware, the accelerating and decelerating range of the spindle motor 10 is set. In this embodiment, the accelerating and decelerating range may be between 2200 RPM (the minimum rotating speed) and 2800 RPM (the maximum rotating speed).

The function of the step 204 is to reduce the number of executing times of the step 204 to be less than five times (counter=0~4). When the processor 304 confirms that the number of executing times of the step 204 reaches five according to the counting value of the counter 306, the controlling method is ended.

In step 206, the driving module 308 drives the spindle motor 10 of the optical disk drive 310 to accelerate and decelerate rapidly within the accelerating and decelerating range for the first time. For example, the motor drives the rotating axis to accelerate from 2400 RPM to 2800 RPM and then to decrease from 2800 RPM to 2400 RPM thus to allow the rotational member 11 rotating synchronously to balance the balls 13 to the vibration damping position in the circular track 12.

In step 208, the processor 304 receives the central error value measured by the pick-up head of the optical disk drive.

The less the central error value which the pick-up head measures is, the better the effect of the vibration damping in the step 206 is (the balls 13 can be balanced to the preferred vibration damping position in the circular track 12).

In step 210, the processor 304 determines whether the spindle motor 10 executes the steps 206 and 208 for the first time according to the value of the counter 306 (Counter=0). When the spindle motor 10 executes the steps 206 and 208 for the first time, the steps 206 and 208 are directly executed for the second time. After the spindle motor 10 executes the steps 206 and 208 for the second time (Counter=1, 2, 3, 4 and so on), a step 212 is executed.

In the step 212, the processor 304 compares the two measured central error values of the pick-up head in the step 208 executed for the first and second times. For example, after the step 206 is respectively executed for the first and second times, the central error values of the pick-up head are compared. When the current central error value of the pick-up head is less than the last central error value, the step 216 is executed. When the present central error value of the pick-up head is greater than the last central error, which means that the balls 13 are balanced to a worse vibration damping position in the circular track 12 after the step 206 is executed, the step 214 is executed next. Therefore, the accelerating and decelerating range of the spindle motor 10 should be adjusted to a better one.

In the step 214, after the processor 304 executes the driving firmware, the accelerating and decelerating range is adjusted to a new one. In this embodiment, the accelerating and decelerating range can be adjusted from 2400 RPM~2800 RPM to 2200 RPM~2800 RPM. Generally speaking, the accelerating and decelerating range should include a resonance frequency range of the optical disk drive. However, the resonance frequency of the optical disk drive is not easily measured, and the resonance frequency range may be very large. Therefore, the controlling method 200 is used to adjust the accelerating and decelerating range to a better one.

In the step 216, the processor 304 determines whether the central error value of the pick-up head is less than a predetermined value (the predetermined value indicates that the vibration of the optical disk drive is within an allowable range). To reduce the controlling time of the ABS, when the central error value of the pick-up head is less than the predetermined value, the controlling method 200 is ended and the processor 304 controlles the spindle motor to accelerate to a working rotating speed.

Further, to reduce the executing time of the controlling method 200, the firmware designer can choose a better accelerating and decelerating range from some experience values as the accelerating and decelerating range when the step 206 is executed for the first time. Therefore, the number of executing times of the step 214 can be reduced.

According to the embodiments aforementioned, in the ball balancing method of the ball ABS according to the invention, the rotating axis is driven to repeat to accelerate and decelerate within a rotating speed range, and therefore the ball is balanced to the best vibration damping position of the circular track. Further, when the auto-balancing system produces a large variation because of manufacturing tolerance, the accelerating and decelerating range is adjusted to apply to all the ABS of the optical disk drives.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for controlling a ball auto-balance system of an optical disk drive comprising a spindle motor and a rotational member containing at least one ball, the method comprising the steps of:

setting an accelerating and decelerating range of the spindle motor between a first rotating speed and a second rotating speed, wherein the first rotating speed is less than the second rotating speed, the first rotating speed is less than a resonance of the ball auto-balancing system, the second rotating speed is greater than the resonance, and the difference between the resonance and the first rotating speed is less than 500 revolutions per minute (RPM);

utilizing the spindle motor to drive the rotational member to accelerate and decelerate within the accelerating and decelerating range at least twice; and measuring a central error value of the optical disk drive after the spindle motor accelerates and decelerates within the accelerating and decelerating range every time, and controlling the spindle motor to accelerate to a working rotating speed if the central error value is less than a predetermined value.

2. The method according to claim 1, wherein the accelerating and decelerating range is between 2200 RPM and 2800 RPM or between 2300 RPM and 3300 RPM.

3. The method according to claim 1, wherein when the spindle motor drives the rotational member to accelerate and decelerate for many times, if the measured central error value is greater than the last measured central error value, the accelerating and decelerating range is adjusted.

4. The method according to claim 3, wherein if the number of times for which the spindle motor accelerates and decelerates within the accelerating and decelerating range is greater than a predetermined number of times, the spindle motor stops accelerating and decelerating.

* * * * *